(12) United States Patent
Schadewald et al.

(10) Patent No.: US 6,320,371 B1
(45) Date of Patent: Nov. 20, 2001

(54) FLEX LEAD EXTENDER

(75) Inventors: Frank William Schadewald, Bloomington; Mark James Schaenzer, Eagan; Robert Paul Ekstrum, St. Paul, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/199,015

(22) Filed: Nov. 23, 1998

Related U.S. Application Data

(60) Provisional application No. 60/070,769, filed on Jan. 8, 1998.

(51) Int. Cl.[7] .................................................. G01R 31/02
(52) U.S. Cl. ....................................... 324/158.1; 324/754
(58) Field of Search ................................ 324/158.1, 754, 324/538, 539

(56) References Cited

U.S. PATENT DOCUMENTS 5,205,741 * 4/1993 Steen et al. ........................ 324/158.1
5,828,223 * 10/1998 Rabkin et al. .................... 324/158.1

* cited by examiner

*Primary Examiner*—Safet Metjahic
*Assistant Examiner*—J. Kerveros
(74) *Attorney, Agent, or Firm*—Merchant & Gould P.C.

(57) ABSTRACT

An interface for connection between a printed circuit board and a device associated with a disk drive apparatus for extending the flexible connection between the printed circuit board and the disk drive device. The device includes a planar substrate relatively flexible to the board, and conductors are formed on the substrate. The conductors are in conductive communication with the circuit board and with a circular flexible wire having conductors associated with the head gimbal assembly of a disk drive device.

15 Claims, 5 Drawing Sheets

FLEX LEAD EXTENDER

The Appln claims benefit of Prov. No. 60/070,769 filed Jan. 8, 1998.

BACKGROUND OF THE INVENTION

This invention relates to connectors for electronic components. In particular the invention is concerned with connectors between a circuit board and a gimbal plate of a disk drive for magnetic storage of data.

The manufacturing process of rigid magnetic disks for such data storage requires the evaluation and certification of the magnetic surface. Within the overall process for this certification, the process is generally divided into two parts:

1. A general surface evaluation of the magnetic media for electrical performance such as amplitude, Phase Width PW 50, asymmetry, overwrite, and other parameters. These parameters are general but relate to a specific set of limits that are generally correlated to operational expectation in a defined environment.
2. The second evaluation is performed using a selected head and operating condition set. This is used to test the media in the in-use type environment. The head disk system and interface, is tested in this manner using a representative lot to qualify the larger lot.

Based on the above need, certifiers or testing devices are used to meet the bulk or first item general performance measurement needs. A head gimbal assembly (HGA) needs to have the necessary lead length to allow the HGA to be mounted in a tester. The interface has normally been supplied by a two-inch wire connected to a circuit board which is a specially designed integrated terminal—paddle board.

While meeting the first certification process is possible with such systems, meeting the second test parameters is not as easily solved. To test the product HGA in the in-use environment, two significant hurdles need to be crossed:

1. The interfacing of the flexure or gimbal plate of the HGA to the tester. This can, in part, be accomplished by mechanical modifications to the receiver of the tester.
2. The second and, more challenging obstacle, is the connection of the electrical wiring of HGA to the test amplifier interface. This obstacle is compounded by the wire size, the need for a considerable length of the wire, the number of times this device is changed, and the confined space allowed for the connections.

At present, because of the continuing reduction of the size of HGA for newer disk drives, the length of exit flexible wires is continuing to decrease. The present testing requires the attachment of a wire extension and then a paddle board of some type. Usually, this involves the handling of fine wires, soldering, and insulation at the bonding area. This provides significant obstacles.

An object of this invention is to provide a system and process for minimizing these difficulties.

SUMMARY OF THE INVENTION

According to the invention there is provided an interface for connection between a printed circuit board and a device associated with a disk drive apparatus for extending the flexible connection between the printed circuit board and the disk drive device. The device includes a flexible substrate, preferably, made of a mylar material, on which conductors are formed. The conductors are in conductive communication with conductors on the circuit board and with flexible conductive wires associated with the disk drive device.

The invention includes the application of a standard integrated terminal paddle board used in tester certifiers and a flex lead extender. The flex lead extender is applied to the integrated terminal—paddle board using a standard wire bond process. The tab of the flex lead extender is attached and then insulated using a standard coating processes. The flexible wire is then wire bonded to the flex lead extender, again with a standard process, at the proper length.

The invention is now further described with reference to the accompanying drawings.

DETAILED DESCRIPTION OF THE PREFERRED EMBODIMENT

In the following description, reference is made to the accompanying drawings which form a part hereof, and which show, by way of illustration, an embodiment of the present invention. It is understood that other embodiments may be utilized and structural changes may be made without departing from the scope of the present invention. The invention is described in relation to a disk drive structure.

Disk Drive Structure

Figure 1:
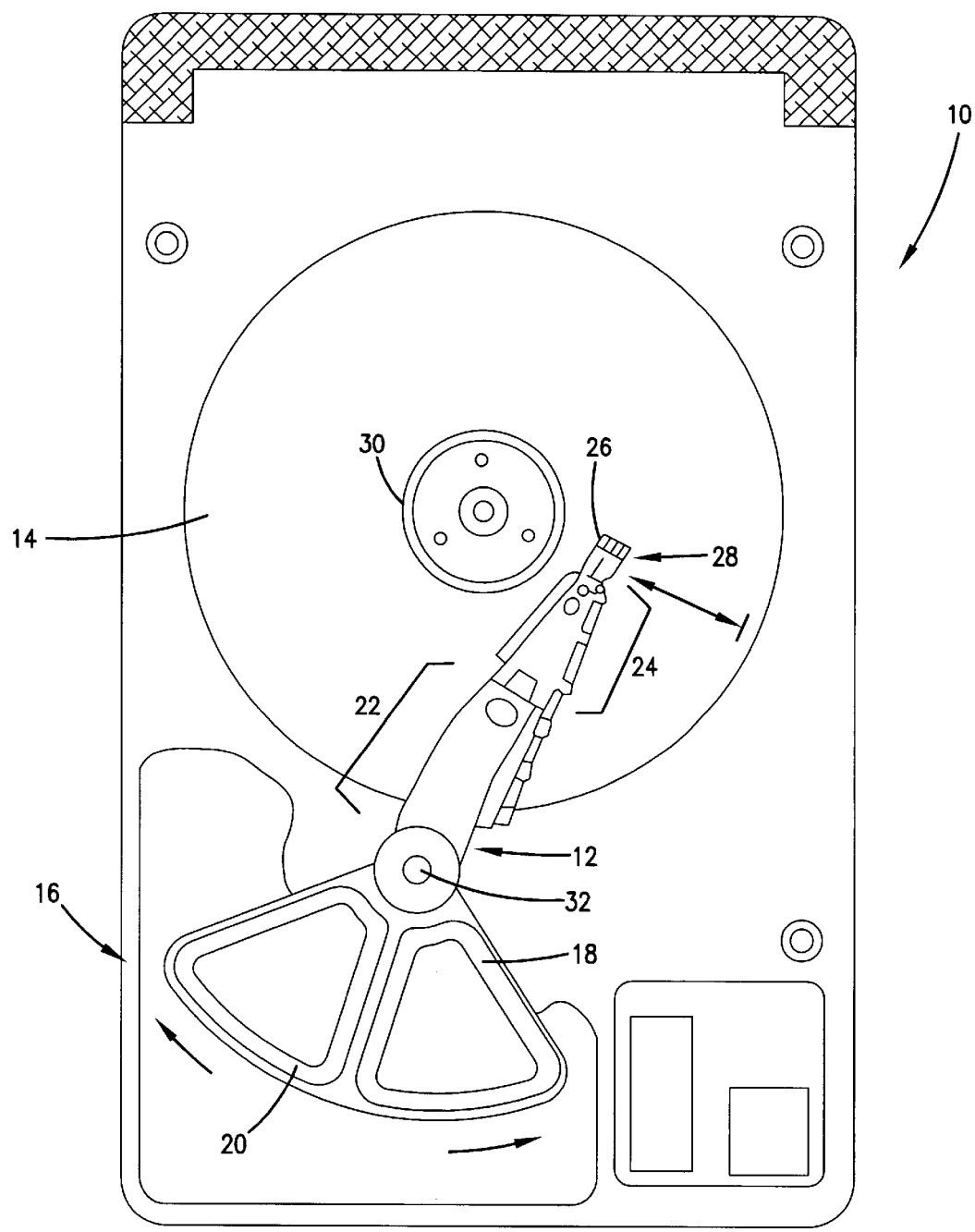
FIG. 1 is a top plan view of a disk drive assembly, wherein a top portion of the assembly has been cut-away to expose a head-arm assembly positioned over a platter.
Figure 2:
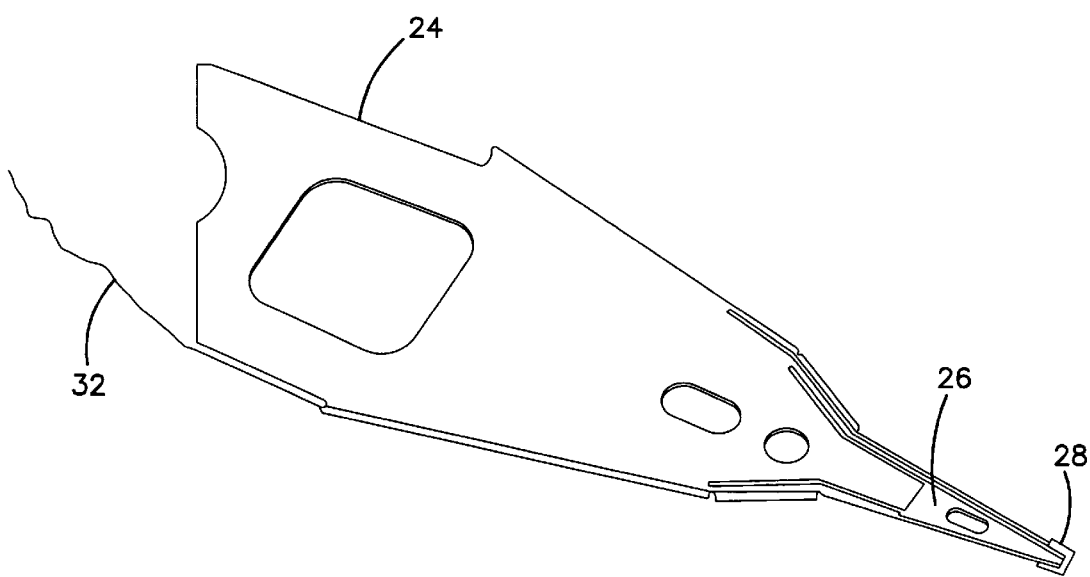
FIG. 2 illustrates an HGA for use with the present invention.

FIG. 1 is a top plan view of a disk drive assembly 10, wherein a top portion of the assembly 10 has been cut-away to expose a head assembly 12 positioned over a platter 14. In addition, a top portion of the magnetic structure assembly 16 is removed in order to expose the coil bobbins 18, 20 of a voice coil motor (VCM) that controls the movement of the head assembly 12. The head assembly 12 includes an arm 22, suspension or gimbal member 24, microactuator 26, and a read/write head 28 positioned over the platter 14. Generally, a plurality of platters 14 are stacked on a spindle 30 and there are a plurality of head-arm assemblies 12 in an E-block structure to access the platters 14 simultaneously, wherein each head assembly 12 accesses one of two surfaces (top and bottom) of each platter 14.

The head assembly 12 comprises both a first stage positioner and a second stage positioner. The first stage positioner comprises the VCM, arm 22, and suspension member 24 that effect rotational movement of the head-arm assembly 12 about a pivot bearing 31 for coarse positioning. The second stage positioner. comprises a microactuator 26 that effects very small, cross-track, movements of the read/write head 28 for fine positioning.

The first-stage positioner positions the read/write head 28 in the vicinity of the desired track of the platter 14. The second stage positioner then precisely aligns the read/write head 28 with the desired track of the platter 14. Thus, the use of the first and second stage positioners of the HGA 24, 26 and 28 allows the disk drive 10 to operate with high track densities and small track pitches.

The four key parts of the invented assembly in a first embodiment are:

1. The HGA assembly, which is a metal part and the head.
2. The flexible wire which extends off the HGA assembly.
3. The flex lead extender, which is a flat plastic and copper part, between the wire and the circuit board, namely the paddle board.
4. The paddle board which is for location in a tester or for use in the disk drive unit.

Figure 3:
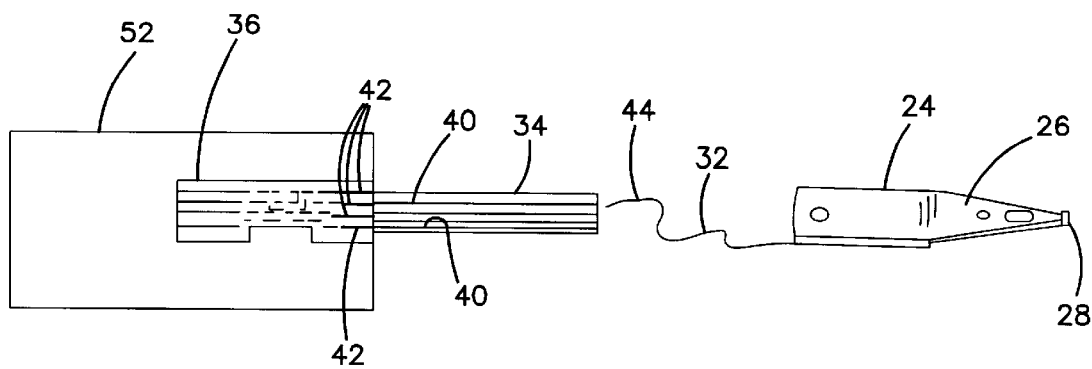
FIG. 3 is a diagrammatic representation showing a circuit board connected with the test apparatus, the flexible extender from the circuit board and the HGA of the disk drive.

With reference to FIG. 3, the HGA 24, 26 and 28 for the disk drive unit 10 includes a gimbal suspension plate 24, 26 and a head 28 which is for location with a flexible wire 32 extending from the head 28.

Figure 4:
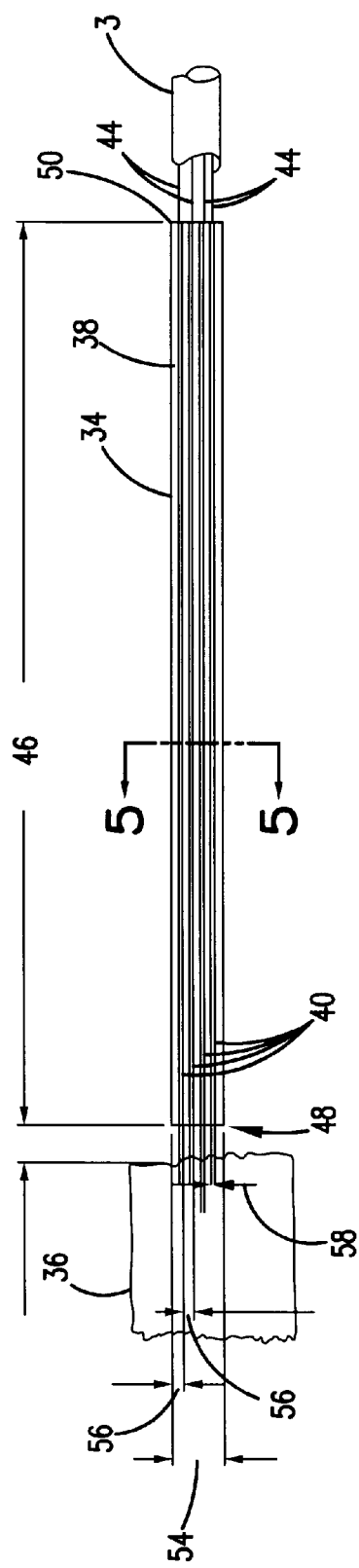
FIG. 4 is a top view of the flexible lead extender showing the conductor terminals formed on the flexible extender.
Figure 5:
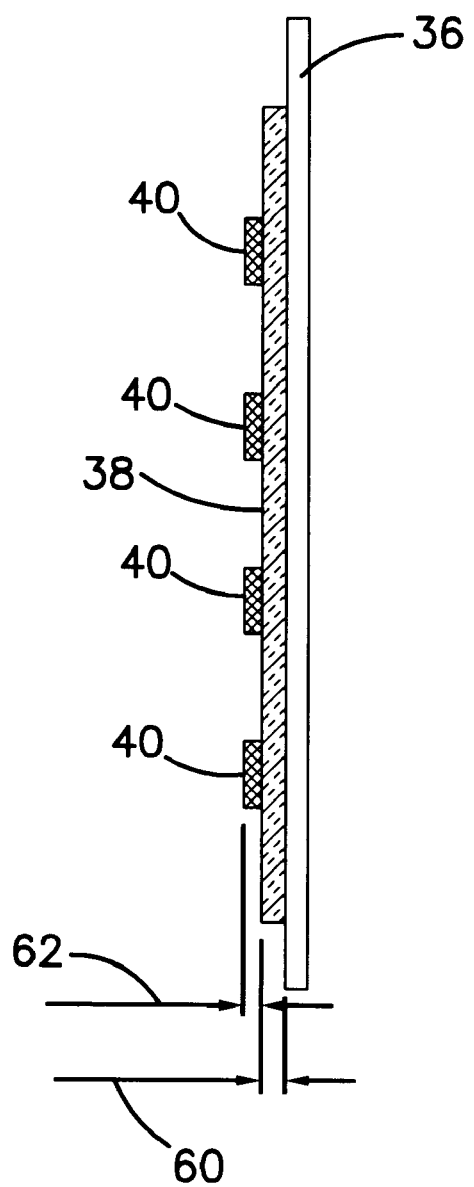
FIG. 5 is an end of the flexible lead extender showing the conductor terminals mounted on the flexible substrate, and the end of a circuit board.

An interface extender 34 is provided for connection between the printed circuit board paddle board 36 and the flexible wire 32 from the HGA 24, 26 and 28. With reference to FIGS. 3 and 4, the interface includes a mylar substrate 38 with a length for projection from the board 36, and conductor lines 40 printed on the substrate 38. The extender 34 is wire bonded to conductors 42 on the board 36 and the interface 34 is otherwise matingly mechanically cemented with the board 36. The opposite end of the conductor leads are wire bonded with conductors 44 in the flexible wire 32 extending from the assembly. The interface includes four spaced conductive leads 40 located on a substrate 38, which is a relatively flexible mylar material.

The substrate 38 is selectively of different lengths 46 thereby to provide selectively different extension lengths to the printed circuit board 36. The relatively flexible planar interface 34 extends between a relatively rigid substrate mounting the printed circuit board 36 and the circular flexible wire 32. The interface includes a first end 48 for bonding to the circuit board 36 and conductor lines 40 running along the interface for connection at the remote end 50 with conductor wires 44 from the flexible wire 32. The interface flex extender 34 includes the substrate 38, and conductive wires 40. The multiple conductor wires 40 run substantially parallel to each other along the interface from the end 48 for connection to the board 36 to the remote end 50 for connection to the substantially circular cross-sectional wire 32.

The planar extender 34 is a flexible insulating material of about 1.25 inches, although different lengths can be chosen. The width 54 of the extender 34 is about 0.075 inches, the spacing 56 between each conductor 38 is about 0.014 to 0.016 inches, and each conductor width 58 is about 0.006 inches. The thickness 60 of the substrate 34 is about 0.002 inches, and the thickness 62 of the copper conductor is about 0.0015 inches.

The invention also includes within its scope a method of testing components for a disk drive device using the interface device 34. This includes a test drive mechanism 52, a circuit board 36 for connecting with the test drive mechanism 52, an interface flex extender 34 extending from the circuit board 36 for connection to the conductors 44 of the flexible wire 32 of a device for a disk drive unit. The flexible member 34 is bonded electrically and mechanically to the board 36 such that conductive elements 40 on the flexible member 34 are in conductive communication with the conductors 42 on the board 36. The flexible member 34 is electrically and mechanically bonded with wires 44 such that the wires 44 are in conductive communication with the flexible member 34.

Advantages

There are at least five significant benefits and advantages which accrue from the invented system and process. These are:

1. Standardization of lead length of the flexible wire in both bulk and special certification for tester commonality.
2. The ability to test product HGAs 24, 26 and 28 in an internal tester 52 without post test changes to the assembly.
3. Stabilization of the mechanical assembly in a process type environment.
4. Defined insulation properties of the complete assembly with minimum changes of process or the addition of weight as consideration.
5. The stability of the product which allows for test and tester correlation.

Conclusion

This concludes the description of the preferred embodiment of the invention. The following describes some alternative embodiments for accomplishing the present invention.

For example, any number of different types of HGAs could be used in with the present invention. Those skilled in the art will recognize that the present invention could be applied to HGAs for both magnetic and optical disk drives.

In another example, data storage devices having different structures and components from those described herein could benefit from the present invention. Those skilled in the art will recognize that the HGA could have a different structure from that disclosed herein without departing from the scope of the present invention. Those skilled in the art will recognize that the present invention could be used with heads that only read, but do not record. Those skilled in the art will also recognize that the present invention could be used to position optical heads rather than magnetic heads. Further different kinds of structures can be used for the flex extender. In some cases the extender may be more rigid and in other cases relatively more flexible. Different numbers of conductors can be provided on the extender as is requited by the circuit board, tester, and HGA, and different lengths of the extender can be provided In yet further aspects of the invention the invented extender can be seen as having application to invention beyond HGAs and disk drive apparatus testers. In this sense it can be considered as a flexible extender between a rigid circuit board and some other device which may be flexible wires or another rigid circuit board.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A disk drive unit comprising:

a head gimbal assembly;

a flexible wire having a plurality of conductor wires extending from the head gimbal assembly and electrically coupled to a head located on the head gimbal assembly;

a printed circuit paddleboard located on a test drive mechanism; and an interface electrically coupling the printed circuit paddleboard to the plurality of conductor wires of the flexible wire extending from the head gimbal assembly, the interface comprising a flexible substrate and a plurality of conductor lines printed on the substrate wherein each of the plurality of conductor lines is coupled to an individual conductor wire of the flexible wire.

2. A disk drive as claimed in claim 1, wherein the interface includes four spaced conductor lines located on a substrate, the substrate, preferably, being flexible relative to the printed circuit paddleboard.

3. A disk drive as claimed in claim 1, wherein the substrate is a planar member of a preselected length to provide a preselected extension projection from the printed circuit paddleboard.

4. The disk drive as claimed in claim 1, wherein conductor wires run substantially parallel along the substrate from one end to another end.

5. The system of claim 1 wherein the flexible interface includes four spaced conductive lines located on the substrate.

6. The system of claim 5 wherein the substrate is a planar member of a preselected length to provide a preselected extension projection from the circuit board.

7. The system of claim 1 wherein the flexible wire has a circular cross-section.

8. A method of testing a component of a disk drive device having a flexible wire, the method comprising the steps of:

mechanically and electrically connecting a circuit board located in the disk drive device to a test mechanism;

mechanically and electrically connecting a flexible interface to the circuit board wherein the interface has a plurality of conductive lines;

mechanically and electrically connecting the conductive lines of the flexible interface to a flexible wire of the disk drive device; and performing a test on a component of the disk drive device, wherein the electrical and mechanical connection between the test mechanism and device are through the board, interface and the flexible wire.

9. A method as claimed in claim 8, further including the step of bonding the flexible interface to the board such that conductive lines on the flexible interface are in conductive communication with conductors on the board, and bonding the flexible interface with the flexible wire.

10. A system for testing a component of a disk drive device having a flexible wire in the disk drive device, wherein there is included a test mechanism comprising:

a circuit board mechanically and electrically connected with the test mechanism;

a flexible interface having conductive lines on a flexible substrate and extending from the circuit board so as to be mechanically and electrically connected with the board; and a flexible wire from of a head gimbal assembly for a disk drive unit, the wire being mechanically and electrically connected to the interface, the conductive elements on the flexible interface being in conductive communication with conductors on the board, and the flexible conductive elements on the flexible interface are electronically bonded with conductive wires of the flexible wire.

11. A system as claimed in claim 10, wherein the substrate is planar and the wire cross-section is circular, and wherein the conductive elements on the substrate are substantially parallel with each other.

12. A disk drive unit comprising:

a head gimbal assembly;

a flexible wire having a plurality of conductor wires extending from the head gimbal assembly and electrically coupled to a head located on the head gimbal assembly;

a printed circuit paddleboard located on a test drive mechanism; and means for electrically coupling the printed circuit paddleboard to the plurality of conductor wires of the flexible wire extending from the head gimbal assembly, the interface comprising a flexible substrate and a plurality of conductor lines printed on the substrate wherein each of the plurality of conductor lines is coupled to an individual conductor wire of the flexible wire.

13. The system of claim 12 wherein the means for coupling includes a flexible interface which includes four spaced conductive lines located on the substrate.

14. The system of claim 13 wherein the substrate is a planar member of a preselected length to provide a preselected extension projection from the circuit board.

15. The system of claim 12 wherein the flexible wire has a circular cross-section.

* * * * *

UNITED STATES PATENT AND TRADEMARK OFFICE
CERTIFICATE OF CORRECTION

PATENT NO.    : 6,320,371 B1
DATED         : November 20, 2001
INVENTOR(S)   : Schadewald et al.

It is certified that error appears in the above-identified patent and that said Letters Patent is hereby corrected as shown below:

<u>Title page,</u>
Item [60], Related U.S. Application Data, "60/070,769" should read -- 60/070,770 --

Signed and Sealed this

Fourteenth Day of May, 2002

*Attest:*

*Attesting Officer*

JAMES E. ROGAN
*Director of the United States Patent and Trademark Office*